Dec. 4, 1923.
W. C. RASTETTER
1,476,544
STEERING WHEEL CONSTRUCTION
Filed Oct. 27, 1921
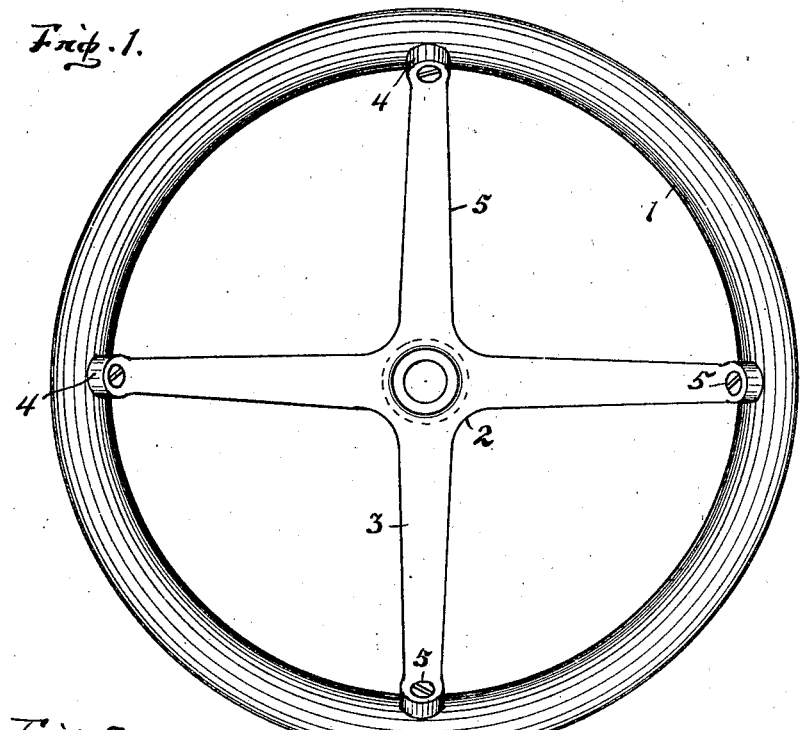
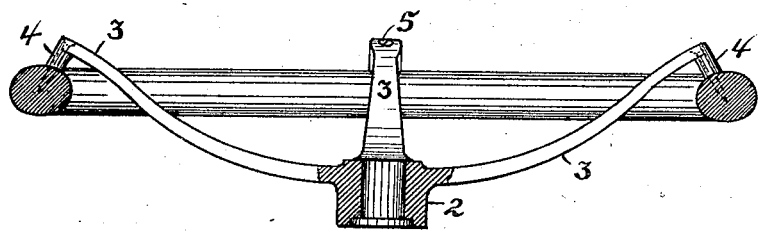
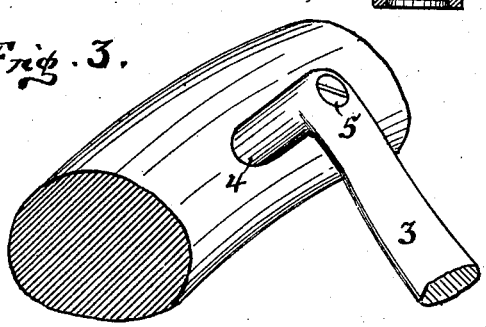
Inventor
William C. Rastetter,
By
W. G. Burns, Attorney Patented Dec. 4, 1923.

1,476,544

UNITED STATES PATENT OFFICE.

WILLIAM C. RASTETTER, OF FORT WAYNE, INDIANA.

STEERING-WHEEL CONSTRUCTION.

Application filed October 27, 1921. Serial No. 510,902.

*To all whom it may concern:*

Be it known that I, WILLIAM C. RASTETTER, a citizen of the United States of America, and resident of Fort Wayne, in the county of Allen and State of Indiana, have invented certain new and useful Improvements in Steering-Wheel Constructions, of which the following is a specification.
This invention relates to improvements in steering wheel construction, comprising a rim and spider secured thereto, and the object of the invention is to afford a steering wheel in which the spider is so formed and the rim mounted in connection therewith as to obviate obstructions to the hands while manipulating the wheel.

This object is accomplished by the construction illustrated in the accompanying drawings in which:—

Fig. 1 is a plan view of a steering wheel embodying the present invention;

Fig. 2 is an elevation projected from Fig. 1, shown partly in central section; and Fig. 3 is a detail view in perspective showing a portion of the rim and one of the spider arms connected thereto.

The characters appearing in the description have reference to parts shown in the drawings and designated thereon by corresponding characters.

The invention comprises a wooden rim 1 mounted in connection with a spider 2 having arms 3. The particular feature of the invention is that the arms of the spider are so formed at their outer extremities that the rim when secured thereto is suspended so as to slightly underhang the ends of the arms to permit the fingers of the operator to slide along the inner perimeter of the rim without interference of the spider arms. In carrying out the invention a pendant lug 4 is formed at the end of each arm, and each lug is positioned on the upper part of the rim between its inner and outer perimeters and is secured in place by a corresponding screw 5 that extends into the rim.

The structure herein is shown as an example of the invention composed of a wooden rim and metallic spider secured together by screws passing through the arms and lugs into the rim. However, I do not wish to be confined to the particular form of the spider, the rim or fastening means set forth as these may be altered and still retain the spirit of the invention.

What I claim is:—

1. A steering wheel comprising a spider and rim, the arms of the spider being so formed as to leave both the inner and outer perimeters of the rim and the bottom thereof free and unobstructed.

2. A steering wheel comprising a rim and spider, the spider having at the end of each arm a pendant lug bearing against and secured to the rim at the top thereof so as to permit free sliding movement of the hands of the operator along the perimeters and bottom of the rim.

In testimony whereof I affix my signature, in presence of two witnesses.

WILLIAM C. RASTETTER.

Witnesses:
MATILDA METTLER,
WALTER G. BURNS.